United States Patent
Cox et al.

(10) Patent No.: US 9,740,508 B2
(45) Date of Patent: Aug. 22, 2017

(54) ALERTING A USER OF AN INDICATED IMPACT OF A COMMAND

(71) Applicant: International Business Machines Corporation, Armonk, NY (US)

(72) Inventors: Susan M. Cox, Rochester, MN (US); Janani Janakiraman, Austin, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/832,886

(22) Filed: Aug. 21, 2015

(65) Prior Publication Data

US 2017/0052792 A1 Feb. 23, 2017

(51) Int. Cl.
| G06F 9/46 | (2006.01) |
| G06F 9/445 | (2006.01) |
| G08B 5/36 | (2006.01) |
| G08B 25/08 | (2006.01) |

(52) U.S. Cl.
CPC ............... *G06F 9/445* (2013.01); *G08B 5/36* (2013.01); *G08B 25/08* (2013.01)

(58) Field of Classification Search
None
See application file for complete search history.

(56) References Cited

U.S. PATENT DOCUMENTS

| 7,084,859 B1 * | 8/2006 | Pryor | G01C 21/3664 345/156 |
| 7,284,009 B2 | 10/2007 | Perrow | |
| 8,384,566 B2 | 2/2013 | Bocirnea | |
| 8,390,572 B2 | 3/2013 | Marsden et al. | |
| 8,928,589 B2 | 1/2015 | Bi | |
| 8,947,351 B1 | 2/2015 | Noble | |
| 2008/0072143 A1 * | 3/2008 | Assadollahi | G06F 3/0236 715/261 |
| 2011/0201387 A1 * | 8/2011 | Paek | G06F 3/0237 455/566 |
| 2014/0256438 A1 * | 9/2014 | Grant | A63F 13/10 463/36 |
| 2014/0267121 A1 | 9/2014 | Luo | |

(Continued)

FOREIGN PATENT DOCUMENTS

WO 2014171026 2/2017

OTHER PUBLICATIONS

Villar, N., Izadi, S., Rosenfeld, D., et al., Mouse 2.0: multi-touch meets the mouse. Proceedings of the 22nd annual ACM symposium on User interface software and technology, 33-42. ACM. Oct. 2009.

(Continued)

*Primary Examiner* — Sisley Kim
(74) *Attorney, Agent, or Firm* — Nicholas D. Bowman

(57) ABSTRACT

Disclosed aspects include alerting a user of an indicated impact of a command using a weight for the command. Using a set of command data which indicates an impact of a first command, a first weight for the first command is established. By monitoring a user, a predicted execution of the first command is detected. By comparing the first weight with a threshold weight, a determination is made to provide an alert to the user. In response to making the determination, the alert is provided to the user.

10 Claims, 4 Drawing Sheets

(56) References Cited

U.S. PATENT DOCUMENTS

2014/0379744 A1* 12/2014 Kuo .................. G06F 17/3097
                                                        707/767
2015/0012871 A1    1/2015 Laubach

OTHER PUBLICATIONS

Simpson, Rich, User Modeling of Assistive Technology, <www.cs.cmu.edu/~cga/behavior/simpson.ppt>.
Davison, B., Hirsh, H., Predicting Sequences of User Actions, <http://www.aaai.org/Papers/Workshops/1998/WS-98-07/WS98-07-002.pdf>.
Spytech Software and Design, Inc., Spytech Keystroke Spy, <http://www.spytech-web.com/keystroke-spy.shtml>.
Albus, Zack, PCB-Based Capacitive Touch Sensing With MSP430, Texas Instruments, <http://www.ti.com/lit/an/slaa363a/slaa363a.pdf>, Jun. 2007.
Oulasvirta, Antti, Nyyssönen, Tuomo; Feb. 2009; vol. 4 Issue: 2; <https://uxpa.org/jus/article/flexible-hardware-configurations-studying-mobile-usability>.

* cited by examiner

ALERTING A USER OF AN INDICATED IMPACT OF A COMMAND

BACKGROUND

This disclosure relates generally to computer systems and, more particularly, relates to alerting a user of an indicated impact of a command. Alerting the user may be desired to be performed as efficiently as possible. The amount of data that needs to be managed by enterprises related to detecting events and alerting users is increasing. As data needing to be managed increases, the need for management efficiency may increase.

SUMMARY

Aspects of the disclosure include alerting a user of an indicated impact of a command using a weight for the command. Using a set of command data which indicates an impact of a first command, a first weight for the first command is established. By monitoring a user, a predicted execution of the first command is detected. By comparing the first weight with a threshold weight, a determination is made to provide an alert to the user. In response to making the determination, the alert is provided to the user.

In embodiments, the set of command data includes at least one of: a historical usage of a set of commands including the first command, a contextual usage of a set of commands including the first command, a pattern-based usage of a set of commands including the first command, a sequential usage of a set of commands including the first command, or a user-provided weighting-factor. In various embodiments, the set of command data may be collected by monitoring the user. The position of the user's fingers may be utilized to predict a command about to be executed. The command may be analyzed to determine if it is a logical command. If it appears that the command to be generated is not logical, then an alert can be provided. Providing the alert can be utilized to prevent the user from making unnecessary mistakes. Weights may be assigned to certain commands having impact. An alert can be presented to the user if the impact from the command may be above a certain threshold.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
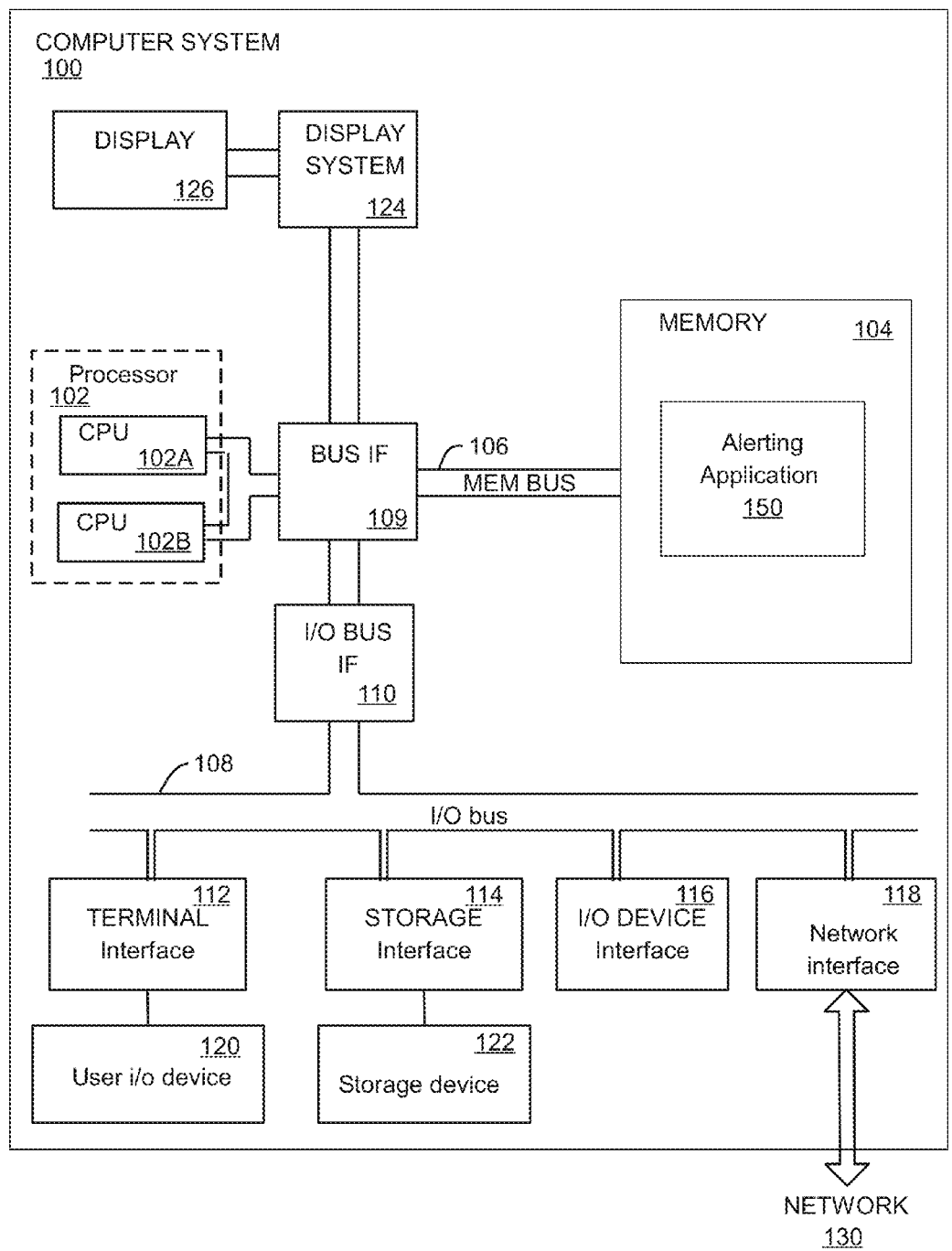
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure use weights assigned to commands (e.g., based on historical usage of the commands) for the purpose of keystroke detection, prediction, or alerts with respect to logical key combinations. The position of the user's fingers may be utilized to predict a command about to be executed. The command may be analyzed to determine if it is a logical command (e.g., based on the user's prior history of commands used). If it appears that the command to be generated is not logical (e.g., close in form but not appropriate in function), then an alert can be generated/provided. Generating/providing the alert can be utilized to prevent the user from making unnecessary mistakes. Weights may be assigned to certain commands having impact. An alert can be presented to the user if the impact from the command may be above a certain threshold (e.g., high impact).

Disclosed aspects include a method, system, and computer program product of alerting a user of an indicated impact of a command using a weight for the command. Using a set of command data which indicates an impact of a first command, a first weight for the first command is established. By monitoring a user, a predicted execution of the first command is detected. By comparing the first weight with a threshold weight, a determination is made to provide an alert to the user. In response to making the determination, the alert is provided to the user.

In embodiments, the set of command data includes at least one of: a historical usage of a set of commands including the first command, a contextual usage of a set of commands including the first command, a pattern-based usage of a set of commands including the first command, a sequential usage of a set of commands including the first command, or a user-provided weighting-factor. In various embodiments, the set of command data may be collected by monitoring the user. In certain embodiments, a triggering event can be identified by analyzing the first command with respect to the set of command data.

In embodiments, execution of the first command may be prevented (e.g., for a temporal period). In embodiments, a suggested command can be provided to the user to replace the first command. Altogether, performance or efficiency benefits (e.g., speed, flexibility, responsiveness, resource usage) may result from alerting a user of an indicated impact of a command using a weight for the command. Accordingly, aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store an alerting application 150. In embodiments, the alerting application 150 may include instructions or statements that execute on the processor 102 or instructions or statements that are interpreted by instructions or statements that execute on the processor 102 to carry out the functions as further described below. In certain embodiments, the alerting application 150 is implemented in hardware via semiconductor devices, chips, logical gates, circuits, circuit cards, and/or other physical hardware devices in lieu of, or in addition to, a processor-based system. In embodiments, the alerting application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
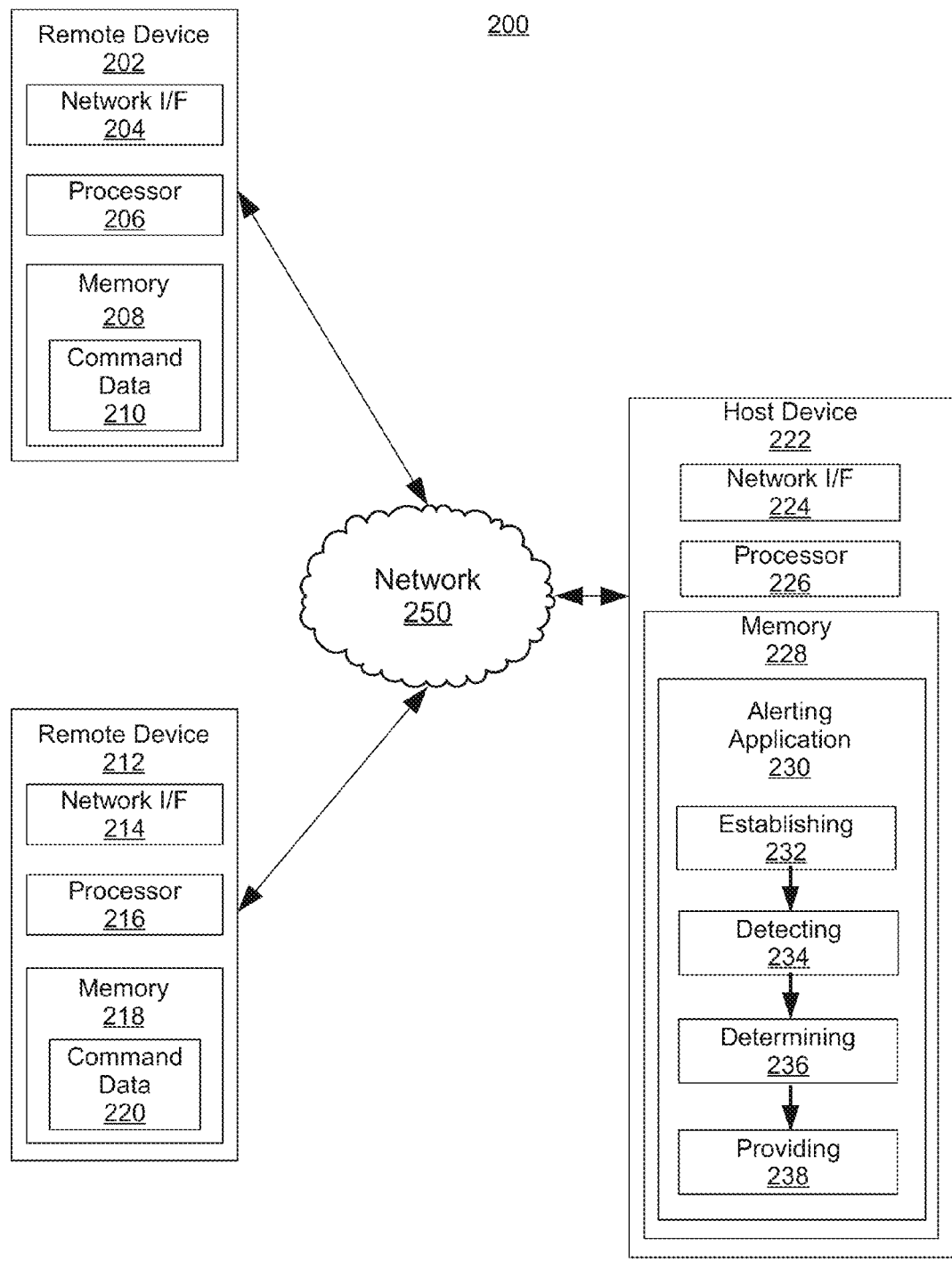
FIG. 2 is a diagrammatic illustration of an example computing environment according to embodiments.

FIG. 2 is a diagrammatic illustration of an example computing environment 200, consistent with embodiments of the present disclosure. In certain embodiments, the environment 200 can include one or more remote devices 202, 212 and one or more host devices 222. Remote devices 202, 212 and host device 222 may be distant from each other and communicate over a network 250 in which the host device 222 comprises a central hub from which remote devices 202, 212 can establish a communication connection. Alternatively, the host device and remote devices may be configured in any other suitable relationship (e.g., in a peer-to-peer or other relationship).

In certain embodiments the network 250 can be implemented by any number of any suitable communications media (e.g., wide area network (WAN), local area network (LAN), Internet, Intranet, etc.). Alternatively, remote devices 202, 212 and host devices 222 may be local to each other, and communicate via any appropriate local communication medium (e.g., local area network (LAN), hardwire, wireless link, Intranet, etc.). In certain embodiments, the network 250 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

Consistent with various embodiments, host device 222 and remote devices 202, 212 may be computer systems preferably equipped with a display or monitor. In certain embodiments, the computer systems may include at least one processor 206, 216, 226 memories 208, 218, 228 and/or internal or external network interface or communications devices 204, 214, 224 (e.g., modem, network cards, etc.), optional input devices (e.g., a keyboard, mouse, or other input device), and other commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices.

In certain embodiments, remote devices 202, 212 may include user data 210, 220. The user data 210, 220 may include information about a user which is configured to be communicated to the host device 222 for processing. As described herein, an alerting application 230 of the host device 222 may be configured to utilize command data 210, 220 to alert a user of an indicated impact of a command using a weight for the command. The alerting application 230 may have a set of operations. The set of operations can include an establishing operation 232, a detecting operation 234, a determining operation 236, and a providing operation 238.

Figure 3:
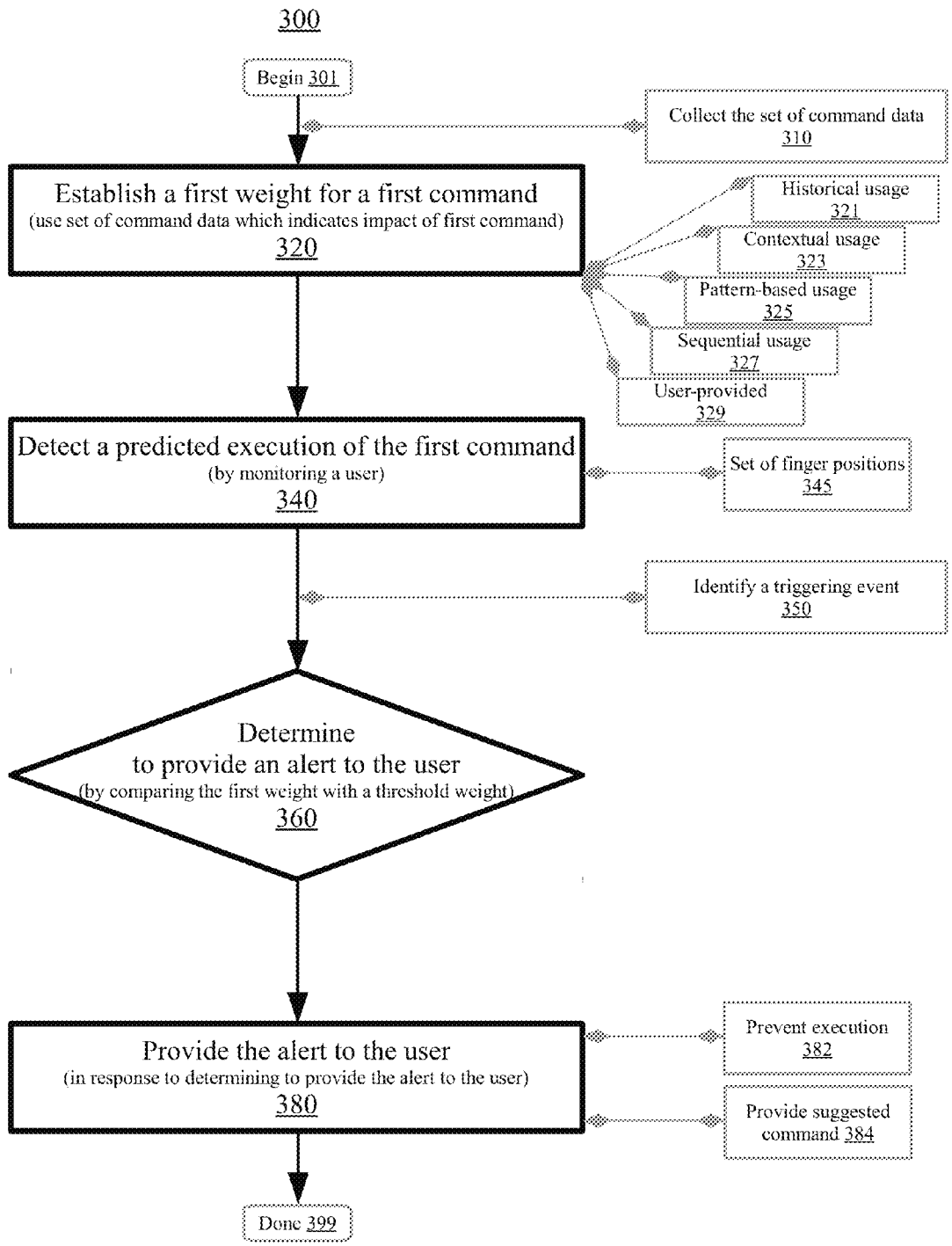
FIG. 3 is a flowchart illustrating a method of alerting a user of an indicated impact of a command using a weight for the command according to embodiments.

FIG. 3 is a flowchart illustrating a method 300 of alerting a user of an indicated impact of a command using a weight for the command according to embodiments. Method 300 may begin at block 301. In embodiments, a set of command data may be collected (e.g., by monitoring the user) at block 310. The set of command data can indicate an impact of one or more commands. A set of impact scores may be utilized to reflect relative impact among the one or more commands. Collecting can include accumulating, acquiring, aggregating, capturing, gathering, obtaining, saving, or storing.

At block 320, a first weight for a first command is established. The establishment includes using the set of command data which indicates an impact of the first command. Establishing can include creating, generating, constructing, organizing, or providing. The first weight may include a numerical value with respect to a scale (e.g., 0.34 on a scale of 0 to 1, 8 on a scale of 1 to 10, 135 on a scale of 0 to 500). The first command may include a key combination (e.g., button pushing, switch triggering) to accomplish a specific functionality (e.g., software operation). For example, Ctrl+Shift+Del may clear a browser cache, Ctrl+Alt+Del may lock a computer screen, Ctrl+F4 may close a single document within an application, or Alt+F4 may completely close the application itself. As such, commands may have impacts which may be scored or weighted (e.g., strong, moderate, light, 95, 55, 10). For instance, completely closing the application may have more impact than closing a single document with the application. Similarly, muting an entire speaker system may have more impact than muting one speaker of the speaker system. As another example, turning-off the heat for an entire building may have more impact than turning off cable television service.

Accordingly, impact and the set of command data may be interrelated. In embodiments, the set of command data includes at least one of: a historical usage of a set of commands including the first command at block 321, a contextual usage of a set of commands including the first command at block 323, a pattern-based usage of a set of commands including the first command at block 325, a sequential usage of a set of commands including the first command at block 327, or a user-provided weighting-factor at block 329 (including combinations thereof). The set of command data may be mapped/connected with various weights, impacts, etc. Examples of aspects of the set of command data as described herein can include those which follow.

Historical usage can include past keystroke history, commands that have been run, a collection of what a set of users (or the particular user) has done/performed/carried-out, or historical patterns across a set of applications. Contextual usage may include a context, environment, or atmosphere of running applications/programs, other users online, power supply status, temperature/altitude/humidity factors, or the like. Pattern-based usage may include commands that may be clustered together, run in bunches, rarely associated with one another, run with respect to a certain criteria, or the like. Sequential usage can include a series of steps/operations performed consecutively or a red step performed in response to a yellow step performed in response to a blue step (e.g., allowing for other intervening steps but including red then yellow then blue). The user-provided weighting-factor may include a user input (e.g., weight for command supplied by a user), an override threshold (e.g., a weight which will not trigger an alert that otherwise would), or a user prone shortcut (e.g., a feature that a particular user has a propensity to perform/ask-for/erroneously-execute, based on adjacency or neighborhood of buttons/keys).

At block 340, a predicted execution of the first command is detected. The detection may occur by monitoring a user. The user may be monitored by a sensory detection device. For example, a video camera, a still image camera, a motion detector, a touch/feel/tactile detector, or the like. Monitoring the user can include capturing commands, keystrokes, touchscreen touches/pushes, swipes, mouse-movement, eye-gazing, or other activities. In embodiments, the predicted execution of the first command is based on a set of finger positions of the user at block 345. For example, a camera can detect the user's finger position indicates Ctrl+Alt+Del may be forthcoming by seeing the left pinky move to Ctrl, the left index move to Alt, and the right hand moving from the 'jkl area.' As such, the predicted execution may include anticipating the first command's keystroke combination. The predicted execution may have a forecast of a process to be carried-out (e.g., plugging in an external projector and adjusting software monitor settings).

In embodiments, a triggering event is identified at block 350. The triggering event can indicate a potential abnormality of the first command. The potential abnormality may indicate a keystroke combination not found above a threshold level in historical usage, for example (e.g., the user rarely if ever opens their nutrition tracker, tax preparation program, and export license submission form without saving at least one of them before rebooting the system without warning). As another example, the potential abnormality may be based on context of the first command not fitting with other running applications. Identification may occur by analyzing the first command with respect to the set of command data. Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use.

At block 360, a determination is made to provide an alert to the user. Determining can include resolving, evaluating, computing, calculating, or comparing. For instance, the determination may include comparing the first weight with a threshold weight. As such, the alert may be determined to be provided/presented/displayed when the first weight exceeds the threshold weight (e.g., 85 exceeds 50 on a scale of 0 to 100). The threshold weight may be predetermined, random, user-defined, based on the set of command data, or be developed using a machine learning technique with respect to specific programs/users or more generally across a multitude/group of programs/users.

At block 380, the alert is provided to the user. Providing may include displaying, presenting, messaging, or notifying. The alert may include a still image, a video, a text notification, a popup, or a freeze of activity until the alert is handled/accounted-for. In embodiments, execution of the first command may be prevented for a temporal period at block 382. The temporal period may be permanently, until an intervening event, for a day, for seconds, or the like. Preventing can include rejecting, prohibiting, blocking, disregarding, suppressing, ignoring, precluding, or at least deterring. In embodiments, a suggested command may be provided to the user to replace the first command at block 384. For example, when running an instant messaging application and a banking program, a suggested command which sends a smiley-face with a thumbs-up in the instant messaging application may be suggested/recommended to replace the first command which deletes all data that has been entered into the banking program.

Method 300 concludes at block 399. Aspects of method 300 may provide performance or efficiency benefits of alerting a user with a warning message (e.g., to get confirmation whether the user intends to perform the key combination in an observed context). For example, aspects of method 300 may include positive impacts on resource usage when detecting various user interactions with button/key entries (e.g., monitoring what the user is typing to determine if an error event may be imminent). Altogether, performance or efficiency benefits for alerting a user of an indicated impact of a command may occur (e.g., speed, flexibility, responsiveness, resource usage, productivity).

Figure 4:
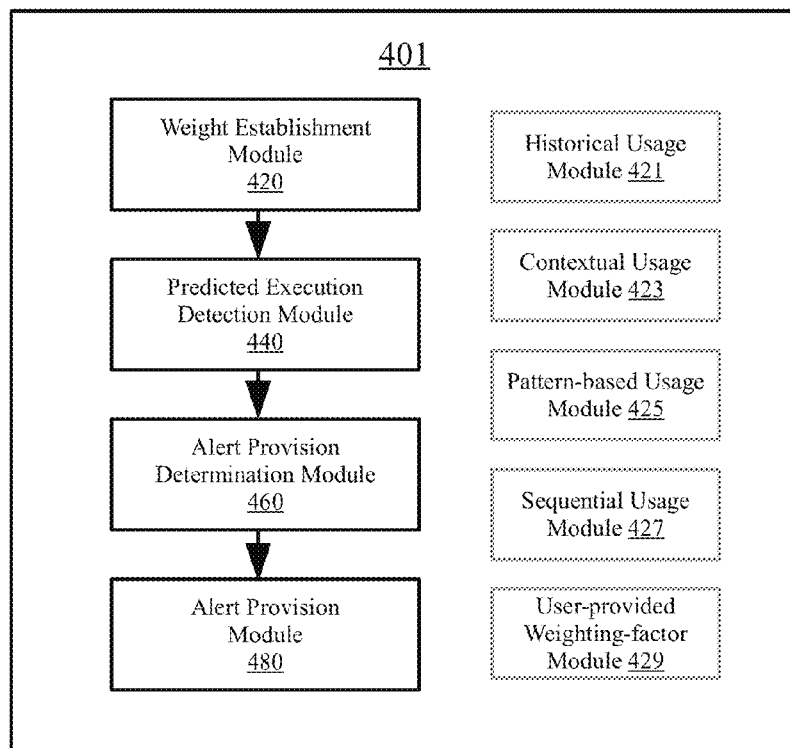
FIG. 4 shows a system of alerting a user of an indicated impact of a command using a weight for the command according to embodiments.

FIG. 4 shows a system 400 of alerting a user of an indicated impact of a command using a weight for the command according to embodiments. In embodiments, method 300 may be implemented in a management module 401 and an operation module 402. As such, aspects of the discussion related to FIG. 3 and method 300 may be used/applied/implemented in the system 400. Management module 401 and operation module 402 may be implemented in hardware, software or firmware executable on hardware, or a combination thereof.

Management module 401 can include a weight establishment module 420 (see discussion with respect to block 320 of FIG. 3), a predicted execution detection module 440 (see discussion with respect to block 340 of FIG. 3), an alert provision determination module 460 (see discussion with respect to block 360 of FIG. 3), and an alert provision module 480 (see discussion with respect to block 380 of FIG. 3). Management module 401 may have a historical usage module 421, a contextual usage module 423, a pattern-based usage module 425, a sequential usage module 427, or a user-provided weighting-factor module 429. Operation module 402 may have a computer user 490 and a monitoring device 495 (e.g., video camera, still image camera).

Consider the example that follows. The system may be equipped with sensor detection and a camera monitoring system. A built-in database may store common key strokes for various applications. The database can mark certain entries with flags to prevent the user from making mistakes (e.g., delete, shift+delete). The system can evaluate that a certain key combination has a higher impact than others and may give more weight to such key combinations. The system may log the user's keyboard navigation and mouse navigation patterns. For example, the user tends to do Ctrl+Shift+Del to clear the browser cache after the user restarts the test server. The system may monitor the user's finger movement. The system can also monitor a current context of the user; for example, the user is working on a web browser and a cloud server interactively.

The system can compare the key strokes that the user is about to press and compare the key strokes with the entries in the database (e.g., using the historical usage module 421). The system may determine whether the set of key combinations is logical in terms of the current context of the user (e.g., using the contextual usage module 423). The system may alert the user with a warning message and suggestion messages when the user is about to make a mistake (e.g., when it detects selected key combination is not logically in the detected context). For example, the user may have just restarted the test server and user's fingers are on top of Ctrl+Alt+Del instead of Ctrl+Shift+Del. Another example is the user just plugged the projector's cable to the laptop so the user is expected to hit Function+F7 to display the screen on the projector. If the user is about to hit Function+F4 which will turn the computer to sleep mode then it does not seem to be logical in this context. The system may alert the user what the key strokes will do and also may ask the user whether the intention was "to hit Ctrl+Shift+Delete." If the user clicks on Yes in the dialog box, then the system may perform the Ctrl+Shift+Del for the user (e.g., display the Clear Browser Cache dialog box).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of alerting a user of an indicated impact of a command of a computer using a weight for the command of the computer, the method comprising:

analyzing a set of command data which maps to an impact of a first command of the computer;

configuring the set of command data to include a user-provided weighting-factor which is based on a user input;

analyzing the user-provided weighting-factor which maps to the impact of the first command of the computer;

establishing, based on analyzing the set of command data which indicates the impact of the first command of the computer, a first weight for the first command of the computer, wherein the first weight indicates a relative impact of execution of the first command on the computer among one or more commands of the computer;

monitoring a user utilizing a sensory detection device to detect an execution of the first command on the computer;

predicting, based on monitoring the user utilizing the sensory detection device, the execution of the first command on the computer;

detecting, by utilizing the sensory detection device to monitor the user, the predicted execution of the first command on the computer;

comparing the first weight with a threshold weight;

resolving that the first weight exceeds the threshold weight;

determining to provide an alert to the user both based on and in response to resolving that the first weight exceeds the threshold weight;

providing, in response to determining to provide the alert to the user, the alert to the user to notify the user of the relative impact of execution of the first command on the computer;

providing a suggested command for execution in a first application program on the computer to the user to replace the first command for execution in a second application program on the computer; and preventing, to provide the user an opportunity to handle the alert, execution of the first command for a temporal period.

2. The method of claim 1, further comprising:

detecting the predicted execution of the first command based on a set of finger positions of the user utilizing the sensory detection device, wherein the sensory detection device is selected from the group consisting of:

a video camera and a still image camera.

3. The method of claim 1, further comprising:

analyzing the first command with respect to the set of command data; and identifying, based on and in response to analyzing the first command with respect to the set of command data, a triggering event which indicates a potential abnormality of the first command, wherein the potential abnormality of the first command is based on a context of the first command not fitting with other running applications.

4. The method of claim 1, further comprising:

configuring the set of command data to include a historical usage of a set of commands including the first command, wherein the historical usage of the set of commands includes a historical pattern of commands that have been run for a set of users across a set of applications; and analyzing the historical usage of the set of commands which maps to the impact of the first command of the computer.

5. The method of claim 1, further comprising:

configuring the set of command data to include a contextual usage of a set of commands including the first command, wherein the contextual usage of the set of commands includes an environment of running applications on the computer when executing the set of commands; and analyzing the contextual usage of the set of commands which maps to the impact of the first command of the computer.

6. The method of claim 1, further comprising:

configuring the set of command data to include a contextual usage of a set of commands including the first command, wherein the contextual usage of the set of commands includes other users online when executing the set of commands; and analyzing the contextual usage of the set of commands which maps to the impact of the first command of the computer.

7. The method of claim 1, further comprising:

configuring the set of command data to include a pattern-based usage of a set of commands including the first command, wherein the pattern-based usage of the set of commands includes commands that are clustered together to be run in bunches with respect to a certain criteria; and analyzing the pattern-based usage of the set of commands which maps to the impact of the first command of the computer.

8. The method of claim 1, further comprising:

configuring the set of command data to include a sequential usage of a set of commands including the first command, wherein the sequential usage of the set of commands includes a series of operations performed with other intervening operations within the series of operations; and analyzing the sequential usage of the set of commands which maps to the impact of the first command of the computer.

9. A system of alerting a user of an indicated impact of a command of a computer using a weight for the command of the computer, the system comprising:

a memory having a set of computer readable computer instructions, and a processor for executing the set of computer readable instructions, the set of computer readable instructions including:

analyzing a set of command data which maps to an impact of a first command of the computer;

configuring the set of command data to include a user-provided weighting-factor which is based on a user input;

analyzing the user-provided weighting-factor which maps to the impact of the first command of the computer;

establishing, based on analyzing the set of command data which indicates the impact of the first command of the computer, a first weight for the first command of the computer, wherein the first weight indicates a relative impact of execution of the first command on the computer among one or more commands of the computer;

monitoring a user utilizing a sensory detection device to detect an execution of the first command on the computer;

predicting, based on monitoring the user utilizing the sensory detection device, the execution of the first command on the computer;

detecting, by utilizing the sensory detection device to monitor the user, the predicted execution of the first command on the computer;

comparing the first weight with a threshold weight;

resolving that the first weight exceeds the threshold weight;

determining to provide an alert to the user both based on and in response to resolving that the first weight exceeds the threshold weight;

providing, in response to determining to provide the alert to the user, the alert to the user to notify the user of the relative impact of execution of the first command on the computer;

providing a suggested command for execution in a first application program on the computer to the user to replace the first command for execution in a second application program on the computer; and preventing, to provide the user an opportunity to handle the alert, execution of the first command for a temporal period.

10. A computer program product of alerting a user of an indicated impact of a command of a computer using a weight for the command of the computer, the computer program product comprising a computer readable storage medium having program instructions embodied therewith, wherein the computer readable storage medium is not a transitory signal per se, the program instructions executable by a processor to cause the processor to perform a method comprising:

analyzing a set of command data which maps to an impact of a first command of the computer;

configuring the set of command data to include a user-provided weighting-factor which is based on a user input;

analyzing the user-provided weighting-factor which maps to the impact of the first command of the computer;

establishing, based on analyzing the set of command data which indicates the impact of the first command of the computer, a first weight for the first command of the computer, wherein the first weight indicates a relative impact of execution of the first command on the computer among one or more commands of the computer;

monitoring a user utilizing a sensory detection device to detect an execution of the first command on the computer;
predicting, based on monitoring the user utilizing the sensory detection device, the execution of the first command on the computer;
detecting, by utilizing the sensory detection device to monitor the user, the predicted execution of the first command on the computer;
comparing the first weight with a threshold weight;
resolving that the first weight exceeds the threshold weight;
determining to provide an alert to the user both based on and in response to resolving that the first weight exceeds the threshold weight;
providing, in response to determining to provide the alert to the user, the alert to the user to notify the user of the relative impact of execution of the first command on the computer;
providing a suggested command for execution in a first application program on the computer to the user to replace the first command for execution in a second application program on the computer; and
preventing, to provide the user an opportunity to handle the alert, execution of the first command for a temporal period.

* * * * *